No. 729,347. PATENTED MAY 26, 1903.
C. C. HUMMEL.
PLUMB AND LEVEL.
APPLICATION FILED DEC. 27, 1902.
NO MODEL. 3 SHEETS—SHEET 1.
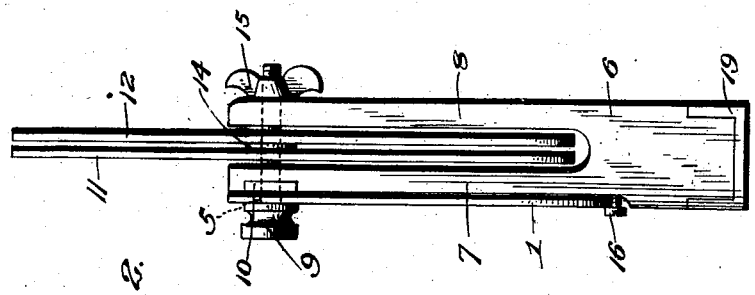
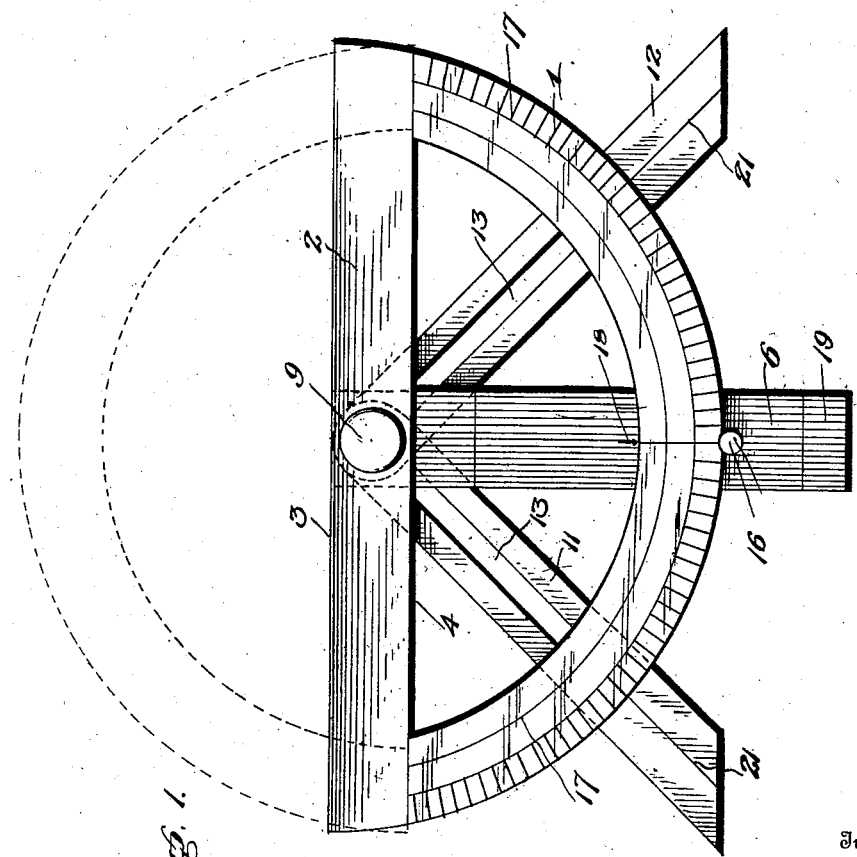
Inventor
Charles C. Hummel
Witnesses No. 729,347. PATENTED MAY 26, 1903.
C. C. HUMMEL.
PLUMB AND LEVEL.
APPLICATION FILED DEC. 27, 1902.
NO MODEL. 3 SHEETS—SHEET 2.
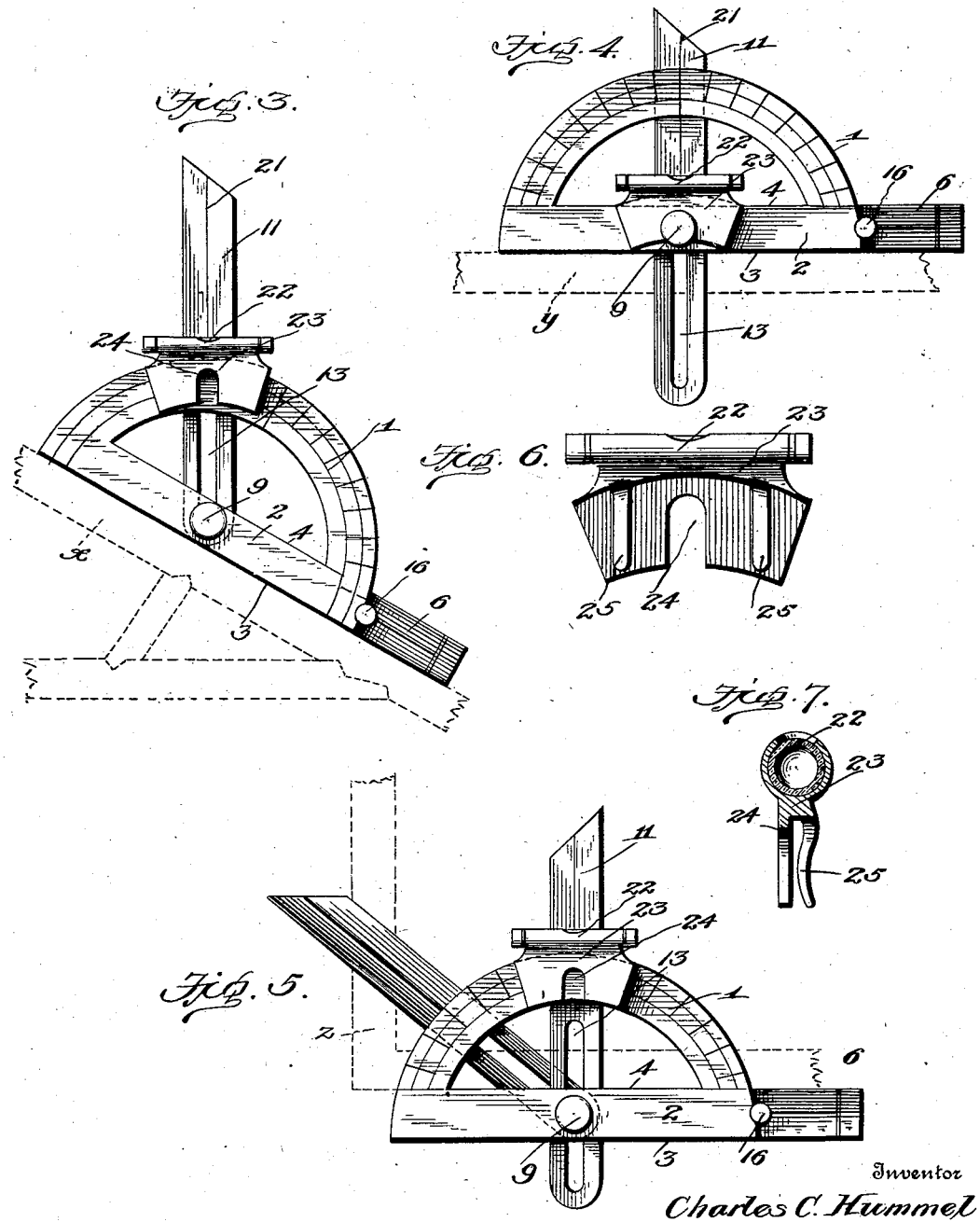
Inventor
Charles C. Hummel No. 729,347. PATENTED MAY 26, 1903.
C. C. HUMMEL.
PLUMB AND LEVEL.
APPLICATION FILED DEC. 27, 1902.
NO MODEL. 3 SHEETS—SHEET 3.
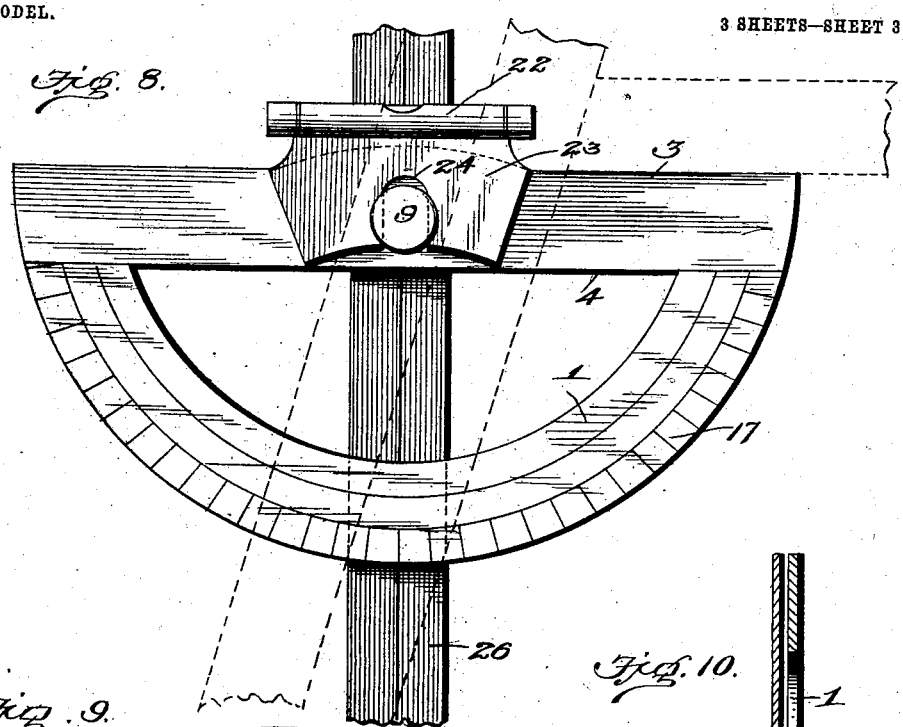
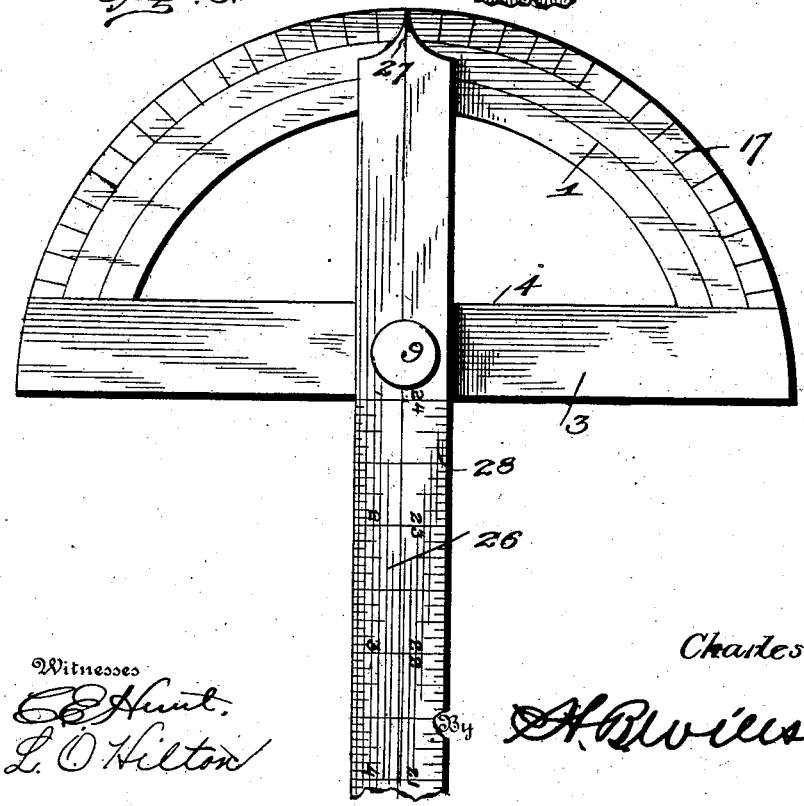
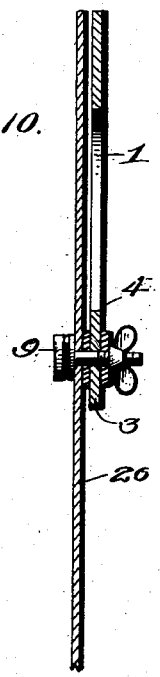
Witnesses
C. E. Hunt.
L. O. Hilton
Inventor
Charles C. Hummel
By H. B. Willson & Co.
Attorneys No. 729,347. Patented May 26, 1903.

UNITED STATES PATENT OFFICE.

CHARLES C. HUMMEL, OF ESPY, PENNSYLVANIA.

PLUMB OR LEVEL.

SPECIFICATION forming part of Letters Patent No. 729,347, dated May 26, 1903.

Application filed December 27, 1902. Serial No. 136,772. (No model.)

*To all whom it may concern:*

Be it known that I, CHARLES C. HUMMEL, a citizen of the United States, residing at Espy, in the county of Columbia and State of Pennsylvania, have invented certain new and useful Improvements in Plumbs or Levels; and I do declare the following to be a full, clear, and exact description of the invention, such as will enable others skilled in the art to which it appertains to make and use the same.

My invention is an improved plumb and level; and it consists in the peculiar construction and combination of devices which will be hereinafter described and claimed.

The object of my invention is to provide a simple, cheap, and compact implement which is adapted for use for the purposes of a plumb and level and also for the purposes of a protractor for ascertaining angles and marking timbers and the like for angle and other cuts.

In the accompanying drawings, Figure 1 is a side elevation of an implement embodying my improvements. Fig. 2 is a similar view of the same at right angles to Fig. 1; and Figs. 3, 4, and 5 are elevations showing my improved implement in various positions and adapted for use for leveling, ascertaining angles, and marking timbers. Figs. 6 and 7 are respectively a detail rear elevation and a detail vertical transverse central sectional view of the level. Fig. 8 is an elevation showing a modification of my invention in which a pivoted rule-blade and also the level are shown connected to the protractor and the implement applied to an inclined timber, which latter is indicated in dotted lines. Fig. 9 is a similar view showing the pivoted rule-blade connected to the protractor and the latter reversed to form a head which, in connection with the rule-blade, enables the implement to be used as a T-square. Fig. 10 is a detail central sectional view of the same.

In the embodiment of my invention here shown I provide a semicircular protractor 1, the arms of which are connected at their ends by a cross-bar 2, having parallel straight edges 3 and 4. In the center of the said cross-bar 2 is an opening 5 of suitable size. This protractor is disposed on the front side of a stock 6, which is preferably of the form here shown and has one end bifurcated to form parallel arms 7 8. A set-screw 9 forms a pivot for the protractor, is inserted in and extends through an opening 5 thereof, and also passes through alined openings near the extremities of the arms 7 and 8. A washer 10 is here shown in a recess or rabbet in the front side of the arm 7 and against which the bar 2 of the protractor is kept in frictional contact by the set-screw 9. A pair of bevel-blades 11 12 are disposed between the arms 7 8 of the stock 6 are provided with longitudinal adjusting-slots 13, through which the said screw 9 extends, and between the said bevel-blades and on the said set-screw is a washer 14. The set-screw is provided with a thumb-nut 15, by means of which the bevel-blades may be clamped in any desired position. A shouldered set-screw 16 engages the stock 6 and is adapted also to engage the protractor at the curved outer edge thereof to secure the protractor at any desired position. The protractor has its curved portion provided with graduations 17, indicating degrees and divisions thereof, and the stock has a fixed pointer 18, coacting with the said scale to ascertain the position of the protractor with reference to the stock and also to ascertain the position of the bevel-blades with reference to the straight edge of the protractor and with reference to each other. One end of the stock is here shown as provided with a reinforce 19. In practice the stock is preferably made of wood; but I do not limit myself in that particular. Each of the bevel-blades is provided with a longitudinal centrally-disposed pointer or mark 21, which is coincident with the center of the pivot-screw 9. I also provide a spirit-level 22, which is carried by a suitable frame 23, that is adapted to be fitted and adjusted on the curved arm of the protractor. This frame has a central opening 24, through which the scale on the protractor may be read to indicate the position of the level with reference to the protractor and the angle subtended between the centers of the level, the curved arm of the protractor, and the center of the pivot-screw 9. This frame is provided on its rear side with spring-arms 25, adapted to bear on one side of the protractor and coact with the frame to secure the spirit-level adjustably and detachably to the protractor. The slots 13 with which the bevel-blades are provided enable the latter not only to be turned to any desired angle with reference to each other and the straight edge of the protractor, but also enable them to be adjusted longitudinally with reference to the pivot-screw 9 and the protractor. The level is shown in Figs. 3, 4, and 5 as applied to the protractor, and the implement is shown in the said figures as applied to the work. In Fig. 3 the implement is shown as in use to ascertain the angle of an inclined beam or timber $x$. In Fig. 4 it is shown as in use in leveling a beam or timber $y$, and in Fig. 5 it is shown as in use for marking a miter-cut on the upright timber $z$.

In Fig. 9 of the drawings I show a rule-blade 26, which is pivotally connected near one end to the protractor by the pivot-screw 9. This rule-blade is provided at its pivotal end with a pointer 27, which operates on the protractor and in coaction therewith indicates the angular position of the rule-blade with reference to the protractor. The rule-blade is provided with one or more measuring-scales 28 on one or both sides to adapt the same for use for measuring purposes. Thus provided the implement is adapted for use for making measurements and for determining the angle of a beam or other part of a building or machine and is especially useful to draftsmen in making drawings of machinery, buildings, and the like. In Fig. 9 the rule-blade 26 is shown as adapted to suspend loosely from the protractor and to coact therewith to enable the implement to be used for the purposes of a plumb.

From the foregoing description, taken in connection with the accompanying drawings, the construction, mode of operation, and advantages of my invention will be readily apparent, it is thought, without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. An implement of the class described, comprising a stock, a protractor pivoted to the stock and having a straight edge and a curved edge, the latter concentric to the pivot, means to secure the stock and protractor together at any desired adjustment, and angle-blades also pivotally connected to the stock, said protractor and angle-blades having coincident pivotal axes, substantially as described.

2. An implement of the class described, comprising a stock bifurcated at one end to form a pair of parallel arms, a protractor on one side of the stock and having a straight edge and a curved edge, angle-blades between the arms of the stock, a pivot connecting said protractor, stock and angle-blades together, said pivot being concentric with reference to the curved edge of the protractor and said angle-blades being provided with longitudinal slots through which the pivot extends, substantially as described.

3. In combination with a protractor, having a curved edge and a straight edge, a bevel-blade, a pivot connecting the bevel-blade to the protractor, and a level having a supporting-frame adapted to fit astride either edge of the protractor and having an opening to clear the pivot, substantially as described.

In testimony whereof I have hereunto set my hand in presence of two subscribing witnesses.

CHARLES C. HUMMEL.

Witnesses:
J. B. ROBISON,
JOHN C. CREVELING.